H. C. FOWLER.
FOLDING DISPLAY TRUCK.
APPLICATION FILED MAY 23, 1919.
1,350,963.
Patented Aug. 24, 1920.
2 SHEETS—SHEET 1.
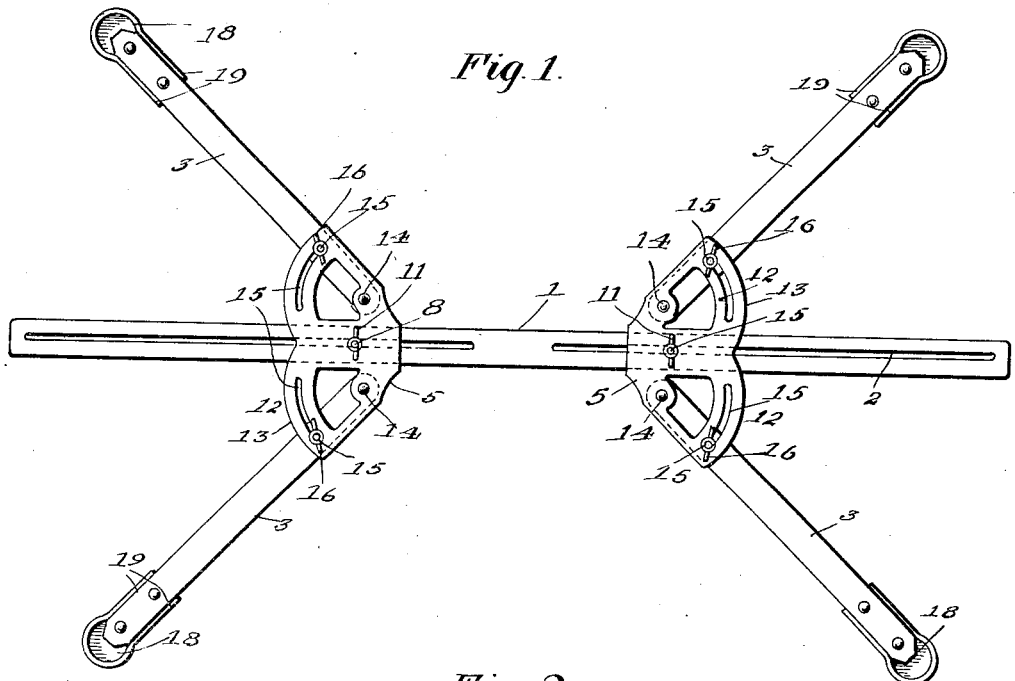
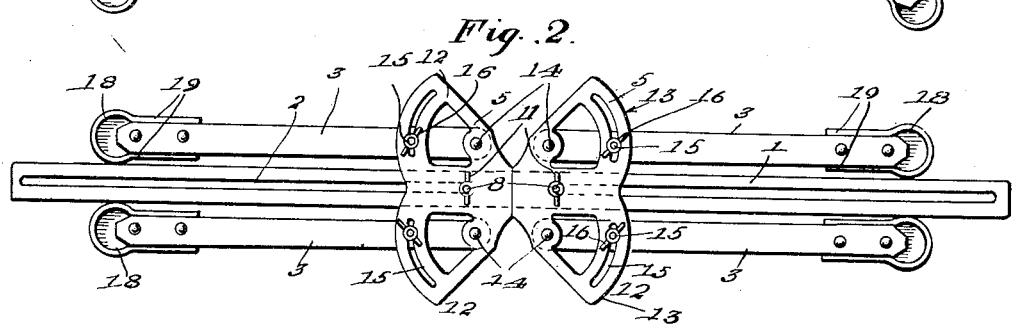
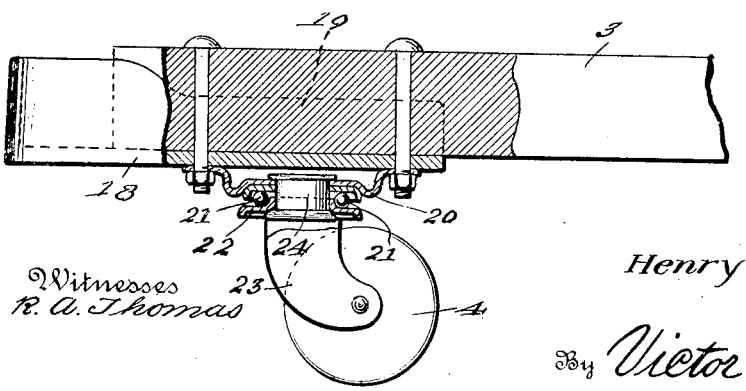
Witnesses
R. A. Thomas
Inventor
Henry C. Fowler
By Victor J. Evans
Attorney H. C. FOWLER.
FOLDING DISPLAY TRUCK.
APPLICATION FILED MAY 23, 1919.
1,350,963.
Patented Aug. 24, 1920.
2 SHEETS—SHEET 2.
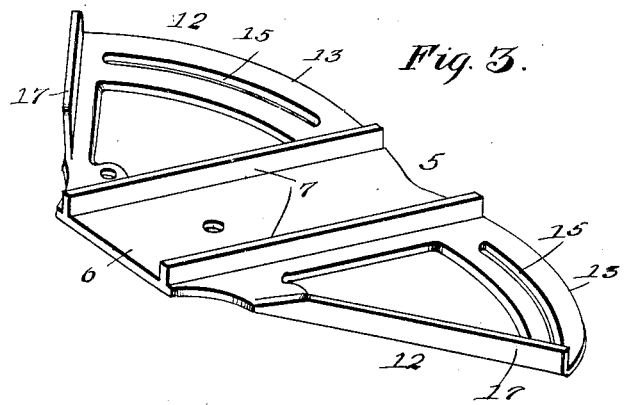
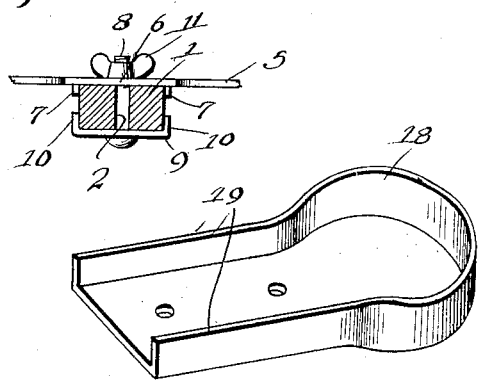
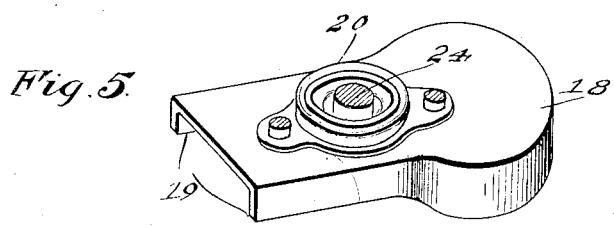
Witnesses
R. A. Thomas
Inventor
Henry C Fowler
By Victor J. Evans
Attorney

UNITED STATES PATENT OFFICE.

HENRY C. FOWLER, OF JOHNSON CITY, NEW YORK.

FOLDING DISPLAY-TRUCK.

1,350,963.  Specification of Letters Patent.  Patented Aug. 24, 1920.

Application filed May 23, 1919. Serial No. 299,099.

*To all whom it may concern:*

Be it known that I, HENRY C. FOWLER, a citizen of the United States, residing at Johnson City, in the county of Broome and State of New York, have invented new and useful Improvements in Folding Display-Trucks, of which the following is a specification.

This invention relates to folding display trucks and is especially designed for supporting oil stoves and the like, the device being particularly useful for the display of stoves and other articles in hardware stores and the like, enabling such articles to be readily shifted from place to place. The truck is also useful for domestic purposes, enabling the housekeeper to move an oil stove from place to place and from room to room as needed.

Another object of the invention is to provide a portable truck which is easily collapsible so that it may be compactly stored or transported.

With the above and other objects in view, the invention consists in the construction, combination and arrangement of parts, as herein described, illustrated and claimed.

In the accompanying drawings:—

Figure 1 is a plan view of the portable truck fully spread.

Fig. 2 is a plan view of the same closed.

Fig. 3 is a bottom perspective view of one of the yokes.

Fig. 4 is a perspective view of one of the wheeled supports.

Fig. 5 is a bottom perspective view of the same.

Fig. 6 is a fragmentary section through one of the supports.

Fig. 7 is a fragmentary vertical cross section through the reach bar adjacent to the clamp.

The truck, in the preferred embodiment thereof, comprises a central longitudinal reach bar 1 having a central longitudinal slot 2.

In connection with the reach bar 1, I employ a plurality of pivotally mounted extension bars 3, the outer ends of which are supported by rollers 4 hereinafter more particularly described. The pivoted bars 3 are connected to the reach bar 1 by means of a pair of yokes 5 each embodying a central body portion 6 having downwardly extending flanges 7 in spaced parallel relation to each other and adapted to embrace the opposite side edges of the reach bar, each yoke being adjustably secured to the reach bar by means of a clamping bolt 8 having a transversely elongated head or plate 9 at its lower end with upturned end flanges 10 which engage the opposite side faces of the reach bar, thereby preventing said head or plate from turning. On the upper end of each clamping bolt is a thumb nut 11, adapting the yoke as a whole to be adjusted longitudinally of the reach bar and firmly clamped at any desired point in the length thereof. Each yoke also comprises oppositely extending arms or wings 12 having arcuate portions 13 formed with curved slots 15 which are described in the arcs of circles of which the pivots 14 of the extension arms 3 are the center. Each extension arm or bar 3 carries a clamping screw 15 having a thumb nut 16, said screw passing through the respective arm 3 and the curved slot in the adjacent wing or arm of the yoke. By the means just described, the arms 3 may be swung outwardly or inwardly and firmly clamped at any point of adjustment. The outward movement of the arms 3 is limited by flanges 17 extending downwardly from the wings or arms of the yoke.

The supporting means for the outer extremity of each of the arms or bars 3 comprises a socket or frame piece 18 having upwardly extending flanges 19 in spaced parallel relation to each other between which is received the outer end portion of the respective bar 3. On its under side, each of said supporting frames or socket pieces is formed with a ball bearing cup or race 20 which receives an annular series of anti-friction balls 21 against which bears the crown portion 22 of a fork 23 in which the respective supporting roller is journaled, said fork being connected to the frame of the support by means of a headed center pin 24. By the means described, each of the supporting wheels or rollers is adapted to adjust itself freely to the movements of the truck as a whole to enable said truck to be pushed in any direction.

From the foregoing description, taken in connection with the accompanying drawings, it will now be seen that the truck is extensible both longitudinally and transversely, thereby adapting it to stoves or other articles of different sizes, both as to their longitudinal and transverse dimensions. The device may be readily and quickly adjusted to suit the length of articles of varying size by adjusting the yokes toward and away from each other and longitudinally of the reach bar. The device may also be adjusted to stoves or other articles of different widths, by swinging the arms 3 outwardly or inwardly and then clamping the same at the desired adjustment. When the device is not in use, the arms 3 may be folded compactly into parallel relation to the reach bar as shown in Fig. 2, enabling the device to be compactly stored or shipped.

I claim:

1. In a truck of the character described, a bar longitudinally slotted, an elongated plate of substantially U-shaped formation in cross section mounted upon the bar for sliding adjustment, a bolt carried by the plate and extended through the slot in said bar, a nut associated with the bolt for holding the plate in a given position, wings projecting from the plate at opposite sides thereof, an extension bar pivoted to each wing, whereby said bars may be arranged divergently with respect to the central bar, or in parallelism therewith, a flange formed on each wing, to limit the outward movement of its associated extension bar, means for holding said extension bars fixed relatively to the first mentioned bar, and rollers carried by the outer end of said extension bars.

2. In a truck of the character described, a central reach bar, a plate mounted upon the bar for sliding adjustment thereon, means for holding the plate in a given position, wings projecting from the plate at opposite sides of the bar, an extension bar pivoted at each wing whereby said extension bars may be arranged divergently with respect to the central bar or in parallelism therewith, means for holding said extension bars fixed relatively to the central bar in any given position, a flange formed on each wing to limit the outward movement of the associated extension bar, and rollers carried by the outer end of the extension bars.

In testimony whereof I affix my signature.

HENRY C. FOWLER.